J. F. KUHN.
COUPLING FOR CHAINS, &c.
APPLICATION FILED JULY 31, 1916.
1,222,217.
Patented Apr. 10, 1917.
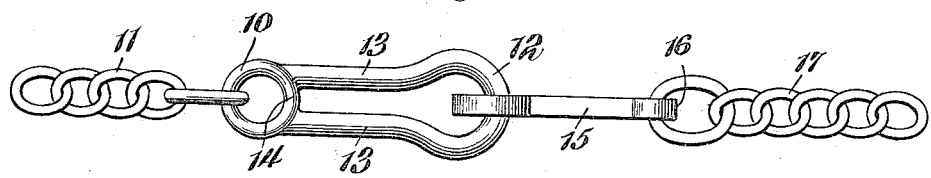
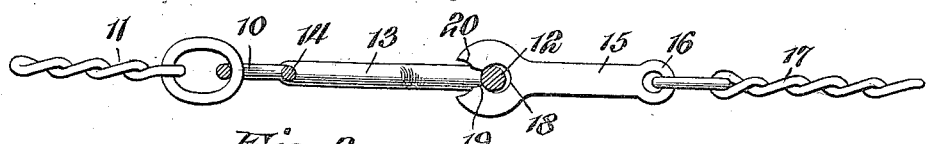
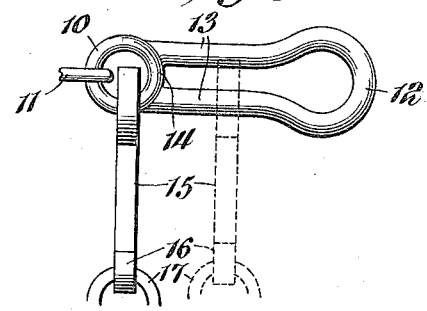
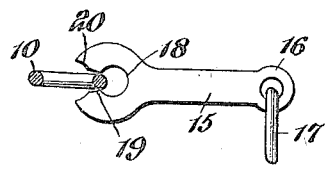
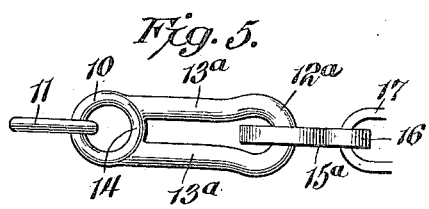
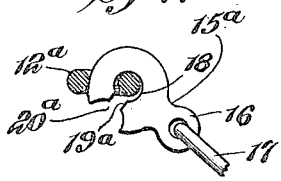
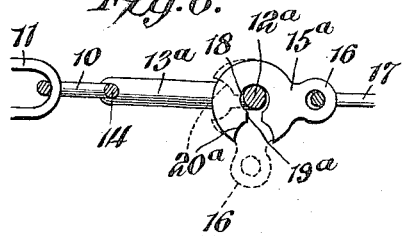
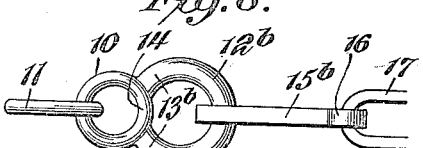
WITNESSES
James F. Kuhn, INVENTOR,
BY
ATTORNEY

UNITED STATES PATENT OFFICE.

JAMES F. KUHN, OF EASTON, PENNSYLVANIA, ASSIGNOR OF ONE-HALF TO ALLEN C. FELLENCER, OF ALLENTOWN, PENNSYLVANIA.

COUPLING FOR CHAINS, &c.

1,222,217. Specification of Letters Patent. Patented Apr. 10, 1917.

Application filed July 31, 1916. Serial No. 112,347.

*To all whom it may concern:*

Be it known that I, JAMES F. KUHN, a citizen of the United States, residing at Easton, in the county of Northampton and State of Pennsylvania, have invented a new and useful Coupling for Chains, &c., of which the following is a specification.

The present invention relates to an improved coupler or separable fastener for use in connecting the ends of chains, or other devices or articles to be separably connected, and has for an object to provide a coupler which is composed of rigid parts, which may be assembled and separated by turning the parts into predetermined angles with respect to each other and by moving the parts relatively to one another in a predetermined direction.

Another object of the present invention is to provide a simple, easily operated coupler adapted particularly for use in jewelry, such as in connecting the chains of necklaces, and the like, and provides a coupler which cannot become separated, except by manually grasping the opposed parts and moving and holding them in a predetermined position during their separation.

Other important features and objects of this invention will be brought out in the following specific disclosure of the present embodiments of the invention, the same being illustrated in the accompanying drawing, wherein—

Figure 1 is a top plan view of a coupler constructed according to this invention.

Fig. 2 is a side elevation of the same, the eye member being shown in section.

Fig. 3 is a top plan view of this coupler, showing in full lines the hook member in position to be removed, and showing in dotted lines the position of the hook member as it is moved toward its releasing position.

Fig. 4 is a transverse section through the inner or attaching end of the eye member, showing the hook member partially released therefrom.

Fig. 5 is a top plan view of another or modified form of coupler constructed according to this invention.

Fig. 6 is a side elevation of the same, the eye member being shown in section, the dotted lines showing the hook member turned down about the eye member.

Fig. 7 is a transverse section through the outer or free end of the eye member, showing the binding of the hook member therein from accidently turning into position to be released.

Fig. 8 is a top plan view of another modified form of the invention.

Fig. 9 is a side elevtion of the same, the eye member being shown in section.

Referring to the drawing, and particularly to the first form shown in Figs. 1 to 4 inclusive, the coupler comprises a hook member and an eye member. The eye member has at its inner end an attaching ring 10, which is of relatively small diameter, and which is adapted for attachment to the end 11 of a chain, or the like, to which one member of the coupler may be applied. This attaching ring 10 carries an outwardly extending loop 12, which is of material considerably thicker or heavier than the ring 10, which is rounded circularly at its intermediate portion, and which has its opposite sides contracted or offset toward each other to provide opposed arms 13 arranged in substantially parallel relation with each other, and being spaced but slightly apart to provide a relatively small passage-way between the arms 13. The inner ends of the arms 13 are secured to the attaching ring 10, and are spaced apart from one another so as to provide a relatively thin or reduced bridge portion 14 across the inner ends of the arms 13.

The hook member comprises preferably a small bar stamped from sheet metal, or the like, and which has a shank 15 having an enlarged apertured ring portion 16 for engagement with the opposite end 17 of the chain, or other suitable article or device adapted to be separably connected with the member 11. The outer or free end of the hook is shown as being enlarged and provided with a relatively large preferably eccentric aperture 18 adapted to receive therein the relatively thick loop 12. At one side of the enlarged head or end of the hook member, there is provided an outwardly flaring throat 20; the inner end 19 of which is contracted, and is of a width less than the diameter of the aperture 18 and also less than the thickness of the material forming the loop 12, for the purpose presently to be explained.

From Fig. 2, it will be noted that the outer end of the throat is wider than the thickness or diameter of the material of which the loop 12 is formed. The provision of this outwardly flaring throat provides opposed walls, which are adapted to receive therebetween one arm 13, when the hook member is turned into the position shown in dotted lines in Fig. 3, the opposite arm 13 being engaged in the aperture 18. The contracted inner end 19 of the throat is of a width greater than the thickness of the material forming the ring 10, so as to permit the easy passage of the said ring therethrough, as shown in Fig. 4.

When it is desired to separate the hook and eye of this form of coupler, the attaching ring 10 with its loop 12 is held in one hand, and the shank 15 grasped in the opposite hand, and turned about the loop 12, until the shank lies at substantially right angles to the longitudinal axis of the eye member. The shank 15 is further turned until the flaring throat registers with one of the arms 13, the shank 15 extending laterally in the plane of the arms 13. While in this position, the shank 15 may then be slid inwardly toward the attaching ring 10, as shown in dotted lines in Fig. 3, the walls of the throat 20 lying against the opposite sides of the remote arm 13 to hold the shank 15 from swinging about the adjacent arm 13 out of the plane of the eye 12.

As the reduced end 19 of the throat is of a greater width than the thickness of the material forming the attaching ring 10 the hook member when it reaches the said ring may be slid inwardly over the latter, as shown in full lines in Fig. 3. When in this position, the shank 15 may be drawn laterally away from the attaching ring, as shown in Fig. 4, to release the members from one another. In applying the members the operations stated above are reversed.

In Figs. 5, 6 and 7 of the drawings, there is shown a slightly modified form of the coupler. In this form, the attaching ring 10 is of the same shape and relative thickness as in the form above described, and is adapted to be attached to a chain 11, or the like, in a similar manner. The loop $12^a$, however, is relatively small, with short arms $13^a$, which are spaced apart and formed of material of greater thickness or diameter than is the material of the attaching ring 10.

The hook member is also relatively short, having a short neck or shank $15^a$, which has at its inner end an attaching eye 16, for engagement with the member 17. The forward end of the neck or shank $15^a$ has an enlarged head provided with a preferably eccentric aperture 18, and which is adapted to receive the loop $12^a$ therein. This enlarged head of the hook member has an outwardly flaring throat $20^a$, which, in this instance, opens through the lower edge of the hook member, instead of through the outer end of the hook member, as shown in Figs. 1 to 4. In Figs. 6 and 7, the outwardly flaring throat is reduced in width at its inner end $19^a$, so as to retain the hook member on the eye member while it is engaged with the loop $12^a$.

In separating the hook and eye of this modified form of coupler, the shank $15^a$ is swung downwardly, while the hook member is in longitudinal alinement with the eye member as shown in Figs. 5 and 6. Because of the eccentric disposition of the aperture 18, should the hook member swing about the eye member in any other position than that shown in Figs. 5 and 6, the turning of the hook member is arrested in the manner shown in Fig. 7.

When the hook member is swung down from the full line position, shown in Fig. 6, into the dotted line position of the same figure, the shank $15^a$ is slid around to one side of the loop $12^a$, and is then slid backwardly and moved along one arm $13^a$ toward the attaching ring 10, the flaring walls of the throat $20^a$ traveling along the upper and lower sides of the remote arm $13^a$, the other arm $13^a$ being in the aperture 18. When the bridge portion 14 is reached, the hook member may then be removed in the same manner as in the first form. The relative positions of the hook and eye members, to effect the separation of the same, are such that they cannot accidentally fall into these positions by vibration, or slack in the chain or the members 11 and 17.

In Figs. 8 and 9, there is shown a third construction of coupler, which conforms to the present invention. The attaching ring 10 is of reduced thickness, as in the case of the two above-described forms, and is adapted to be secured to the end of the chain or member 11. The loop $12^b$ is of greater thickness or diameter than the attaching ring, and is also of ring form. One side of the ring $12^b$ intersects the attaching ring 10, and has its opposite arms $13^b$ joined by a bridge portion 14.

The hook member of this form of coupler comprises a relatively long narrow shank $15^b$, which is preferably of substantially uniform width from end to end, and provided on its inner end with an attaching eye 16, to which may be coupled the opposite end of the chain 17, or other object. The forward end of the shank $15^b$ is provided with a large aperture 18 to receive the loop $12^b$ therein. At one side of the aperture 18 is a throat or slot $20^b$, which is of a width less than the thickness or diameter of the loop $12^b$, to retain the loop $12^b$ in the aperture 18.

In this third form of the invention, when it is desired to separate the hook member from the eye member, the eye member is held in one hand, and the hook member is slid by the other hand around the loop $12^b$, and in the plane thereof, until the ring 10 is reached, when the width of the throat 20$^b$ allows the hook member to pass the bridge portion 14. As the attaching ring 10 has a thickness less than the width of the throat, the hook member may be readily withdrawn by moving the same outwardly or radially from the attaching ring 10.

A feature common to all three forms of this invention is the provision of a hook member which must be turned at substantially right angles to the line of draft through the coupler, and which, while in this right angular position, must be slid inwardly to the attaching ring, or inner end of the eye, to be released. As in each instance, the bridge portion 14 lies in the plane of the loop, the throat leading from the enlarged aperture 18 must always be brought into line with the bridge portion, and the hook member must always lie in a certain definite plane with respect to the plane of the loop before the members may be moved inwardly to be separated.

The flared walls of the throat provide guarding means to limit the turning of the hook member on the eye member and to determine the one position into which the hook member must be adjusted before the same may be moved backwardly over the loop to be separated.

The elongated loops 12 and 12$^a$ are preferably employed where the chain, or other device or devices, connected are likely to rest too freely, or provide too much slack between the attaching ends of the coupler, such as when used in connection with harness, long chains, or the like.

The form shown in Figs. 8 and 9, wherein the loop 12$^b$ is in the form of a ring, the parts of the coupler will be held securely from separation when used with short necklaces, or neck-chains, where there is little or no slack between the attaching ends of the coupler.

It is, of course, understood that the coupler of this invention may be made of any suitable material, such as precious or other metals, and may be used in jewelry construction, or in any other construction, where a coupler of this nature will be advantageous. It may be noted that the hook member of this coupler is in each instance provided with a relatively flat shank upon which may be stamped the quality or other information desired. The parts of this coupler may be made in any desired artistic shapes or forms, which may be found practical without detriment to the strength of the parts, and which will adapt the coupler to the various particular uses to which the same may be applied.

What is claimed is:—

1. A coupler formed of an eye member and a hook member, the eye member having a reduced inner end which provides an entrance to the eye member, and the hook member having an aperture through which the eye member is passed, and a throat leading from the aperture outwardly, said throat having a width less than the main portion of the eye member, so as to prevent its separation therefrom, but having a greater width than the reduced end of the eye member, so as to allow the disconnection of the hook member from the eye member when the hook member is moved into registry with the reduced end of the eye member, the opposite walls of said throat engaging with said eye member so as to hold the hook member from turning as it is moved along the eye member.

2. A coupler comprising a hook member and an eye member, the eye member being formed of an attaching ring, and a ring or loop projecting therefrom, the attaching ring being made of material having a less thickness than the ring or loop, and being located at one end of the ring or loop, and the hook member having an aperture to receive the bar of the ring or loop, and an entrance throat in communication with the aperture and leading outwardly to the periphery of the hook member, the width of the throat being less than the thickness of the material of the ring or loop but greater than the thickness of the attaching ring, so as to prevent the separation of the hook member from the eye member while the hook member is on the ring or loop, but allowing its disconnection from the eye member when the hook member has come into registry with the attaching ring.

3. A coupler comprising an eye member and a hook member, the eye member being formed of a pair of rings or loops joined together so that one closes the entrance to the other, one of the rings or loops being made of material of less thickness than the other, and a hook member having an aperture of a diameter to receive the bar of the ring or loop which is of greater thickness, said aperture permitting the hook member to be slid along the bar of said loop from one end to the other, and an entrance throat to the aperture leading outwardly to the periphery of the hook member, said entrance throat being of a width to prevent the separation of the hook member from the eye member while the hook member is on the ring or loop of greater thickness, but allowing the disconnection of the hook member from the eye member when the hook member has been brought into registry with the ring or loop of reduced thickness.

4. A coupler comprising an eye member and a hook member, the eye member being made up of a loop and a ring which are in longitudinal alinement and are united, the ring closing the entrance to the loop and being made of material thinner than the same and located at one end of the loop, and the hook member being provided with an aperture to receive the loop, and a throat communicating with and leading from the aperture outwardly to the periphery of the hook member, said throat being of a width to prevent the disconnection of the hook member from the eye member while the hook member is on the loop of the eye member, but allowing its removal from the eye member when the hook member is brought into conjunction with the ring of the eye member.

5. A coupler comprising a ring adapted for attachment to the end of a chain, a loop made of material thicker than the ring and extending outwardly from the latter and having its ends spread apart and secured to the ring, a hook member having an aperture therein to receive the loop therethrough, and having at one side of the aperture and in communication therewith a flaring throat with a contracted inner end, the width of the throat and its contracted portion being sufficient to permit the passage of the attaching ring therebetween for separating and interlocking the hook member and the ring and loop.

6. A coupler comprising an attaching ring, an outwardly extending loop lying substantially in the plane of the ring and having its inner ends spaced apart and secured to the ring to provide at one end of the loop a bridge portion, the ring being made of material of less thickness than the material of the loop, and a hook member having an aperture to receive the loop therein, and having a throat at one side of the aperture and in communication therewith to retain the loop in the aperture, the outer end of the throat being widened or flared so that when the hook member is moved along the loop and the flaring throat brought into register with the bridge portion, the hook member is allowed to pass across the bridge portion onto the ring and is thereby released.

7. A coupler comprising an attaching ring, an elongated loop having its ends secured in spaced apart relation to the attaching ring and its opposite arms arranged substantially in parallelism with each other and joined at their other ends by a relatively large circular bend, and a hook member having an aperture therein to receive said loop, and having a flaring throat at one side of the aperture with a contracted inner end of less width than the thickness of the loop and of greater width than the thickness of the attaching ring, said hook member being adapted to slide along one of said parallel arms, with the outwardly flaring throat receiving the opposite parallel arm of the loop to hold the hook member from turning out of the plane of the loop, the hook member being released from the eye member when the attaching ring is reached in the sliding movement of the hook member.

8. A coupler comprising an attaching ring, a loop extending outwardly from the ring, a hook member having a head provided with an eccentric opening therethrough to receive the loop therein, said head having an outwardly flaring throat adapted for engagement with the opposite side of the loop to limit the turning of the head, said loop having its opposite ends secured against one side of the attaching ring to provide a passage in the loop, the inner end of said throat being contracted to a width less than the thickness of the loop and greater than the thickness of said attaching ring, whereby upon the sliding inwardly of the head along said loop and over said attaching ring the hook member may be detached from the loop and the ring.

9. In a device of the class described, an eye member formed of a pair of rings or loops joined together so that one ring or loop extends across and overlaps a part of the other ring or loop and thereby closes the entrance thereto, one of said rings or loops being smaller than the other.

In testimony that I claim the foregoing as my own, I have hereto affixed my signature.

JAMES F. KUHN.